United States Patent [19]

Stein et al.

[11] Patent Number: 5,382,555

[45] Date of Patent: Jan. 17, 1995

[54] HIGH ALUMINA BRICK WITH METALLIC CARBIDE AND ITS PREPARATION

[75] Inventors: Joseph L. Stein, Pittsburgh, Pa.; Donald A. McIntyre, Aurora, Ohio; P. Sean McHugh, Duncanville, Pa.

[73] Assignee: General Acquisition Corporation, Mexico, Mo.

[21] Appl. No.: 142,501

[22] Filed: Oct. 22, 1993

[51] Int. Cl.$^6$ .............................. C04B 35/10
[52] U.S. Cl. ........................ 501/127; 501/89; 501/128
[58] Field of Search .............. 501/87, 89, 127, 128, 501/131

[56] References Cited

U.S. PATENT DOCUMENTS

| | | |
|---|---|---|
| 3,164,482 | 1/1965 | Renkey ..................... 501/89 X |
| 3,164,483 | 1/1965 | McCreight et al. . |
| 3,892,584 | 7/1975 | Takeda et al. . |
| 4,093,470 | 6/1978 | Cherry . |
| 4,424,281 | 1/1984 | Jones ...................... 501/127 X |
| 4,751,204 | 6/1988 | Kyoden et al. ............... 501/89 |
| 4,889,834 | 12/1989 | Niihara et al. . |
| 5,147,830 | 9/1992 | Banerjee et al. ............ 501/89 |

*Primary Examiner*—Karl Group
*Attorney, Agent, or Firm*—Howson and Howson

[57] ABSTRACT

A high alumina refractory and its preparation are disclosed. In addition to the mix of alumina particles providing an $Al_2O_3$ content of at least 50%, by weight, there is included metallic carbide particles, having a critically-selected particle size distribution, in an amount between about 3 and about 25%, by weight, based on the total dry weight at the mixture. Other forms of carbon, like tar, pitch and graphite are omitted. The product is free from black core and has improved resistance to molten slags and metals.

12 Claims, No Drawings

HIGH ALUMINA BRICK WITH METALLIC CARBIDE AND ITS PREPARATION

BACKGROUND OF THE INVENTION

The present invention relates to an improved fired, fireclay-bonded high alumina refractory and to its method of preparation; and, more particularly, the invention relates to a fired, fireclay-bonded high alumina refractory having improved properties, especially resistance to erosion by molten slags and metals while being substantially free from black core, to its method of preparation and to the green, pre-fired body from which it is made.

The manufacture of high alumina refractories, like brick, that is, refractories containing over 50% $Al_2O_3$, generally involves blending various high and low alumina refractory materials. Traditionally, clays with less than 50% $Al_2O_3$ are enriched with a high alumina material such as calcined bauxite; calcined or tabular alumina; kyanite; raw or calcined fireclay, and the like. Other non-basic refractory aggregates well known in the refractories field may be included. Carbonaceous material, principally tar, pitch or graphite, is incorporated in the refractory generally by impregnation after firing in the case of tar and pitch; however, particulate carbon, such as graphite or milled pitch, may be added to the mix before shaping and firing.

Impregnation of high alumina brick with hot tar or pitch must be completed after the brick has been fired to prevent oxidation of the tar or pitch. This requires additional handling, time and cost. Moreover, with tar-or pitch-impregnated brick used as a lining for vessels handling "hot metal", as in torpedo cars and iron handling linings, a large amount of fume is generated when the volatiles burn out. This fume represents a health and environmental hazard.

Another problem associated with fired, fireclay-bonded high alumina refractory brick is what is known as "black core". Black core brick, aside from aesthetic aversion by masons to the discoloration, possess other properties which would be undesirable especially in hot metal car applications. Such undesirable properties include reduced thermal shock and spalling resistance.

Black core is the result of incomplete oxidation of carbonaceous matter in the raw materials, and is caused by iron being held in the reduced state. This reduced state is brought about by carbon impregnating the microstructure as carbon monoxide. If the iron in the mixture is still in the ferrous (reduced) state at a temperature above 1900° F., it will behave as a flux. This behavior further seals the microstructure, inhibiting the flow of oxygen and the products of combustion, ultimately resulting in black core.

It has been suggested to eliminate carbonaceous material from high alumina refractories and to include very finely divided SiC as a source of carbon. However, such simple substitution as suggested by the prior art does not eliminate black core.

McCreight et al. U.S. Pat. No. 3,164,483 discloses a high alumina refractory made without carbonaceous material, such as tar, pitch or graphite, and containing very finely divided SiC; that is, containing at least 5%, by weight, −325 mesh SiC and preferably more. Takeda et al. U.S. Pat. No. 3,892,584 discloses monolithic high alumina refractory materials containing SiC and carbon. The product is fired in a reducing atmosphere. Cherry U.S. Pat. No. 4,093,470 discloses a high alumina refractory containing the usual graphite and a volatilized silica binder. An optional addition is SiC.

It is the principal object of the present invention to provide a fired, fireclay-bonded high alumina refractory possessing improved properties including especially substantial freedom from black core and, hence, attendant characteristics associated with that condition.

Another object of the present invention is to provide a fired, fireclay-bonded high alumina refractory substantially devoid of elemental carbon, as from tar, pitch, graphite and the like, and containing as substantially the only carbon-containing material a metallic carbide of critically-selected particle size distribution to provide a product possessing improved properties including essential absence of black core.

These and other objects including the provision of an unfired, mix adapted for firing under oxidizing or reducing conditions to provide the improved fired refractory as well as methods for preparing the unfired and fired products will become apparent from a consideration of the following specification and claims.

It has been found that, in the preparation of fired, fireclay bonded high alumina refractories especially adapted for forming into shapes, like brick, and firing under either oxidizing or reducing conditions, the substantial elimination of carbon, as from carbonaceous materials such as tar, pitch, graphite, and the like and the inclusion of a particulate metallic carbide in a defined amount and of a critically selected particle size distribution, provides a refractory product possessing improved properties as discussed more in detail hereinafter.

SUMMARY OF THE INVENTION

The pre-fired product of the present invention, therefore, comprises: in a high alumina refractory body adapted to be fired to provide a fired, fireclay-bonded high alumina refractory and containing an intimate mixture of alumina materials to provide an alumina content of at least 50 percent, by weight, based on the dry weight of the mixture, the improvement wherein: (1) there is also included in the mix metallic carbide particles in an amount between about 3 and about 25 percent, by weight, based on the total dry weight of the mixture, said particles having a particle size of from −3 mesh to +325 with no more than 1.5 percent, by weight, of metallic carbide particles in the mixture being −325 mesh, and (2) the mix is otherwise substantially free of carbon.

The fired product of the present invention comprises: in a fired, fireclay-bonded high alumina refractory body containing a mix of ceramically-bonded particulate alumina materials providing an alumina content of at least 50 percent, by weight, the improvement wherein: (1) there is also included in the mix metallic carbide particles in an amount between about 3 and about 25 percent, by weight, based on the total dry weight of the mix, said particles having a particle size of from −3 mesh to +325 with no more than 1.5 percent, by weight, of metallic carbide particles in the mix being −325 mesh, and (2) the mix is otherwise substantially free of carbon.

The method of the present invention, therefore, comprises: in the preparation of a fired, fireclay-bonded high alumina refractory shape involving mixing particulate alumina materials, to provide an alumina content of at least 50%, by weight, based on the dry weight of said mixture, and water to provide a moldable mix, shaping the resulting mixture and firing the shaped body, the improvement wherein: (1) there is included in the mix metallic carbide particles in an amount between about 3 and about 25 percent, by weight, based on the total dry weight of the mix, said particles having a particle size of from −3 mesh to +325 mesh with no more than 1.5 percent, by weight of metallic carbide particles based on the total dry weight of the mix being −325 mesh, and (2) there is substantially excluded from the mixture carbonaceous material.

DESCRIPTION OF THE PREFERRED EMBODIMENTS

In accordance with conventional practice in the production of ceramically-bonded, nonbasic refractory shapes, size-graded alumina-containing refractory material is blended and mixed with water which may contain a small amount of a green strength binder, like sulfonated lignin. The alumina-containing refractory material will be selected to provide an overall $Al_2O_3$ content of over 50%, by weight, and up to about 90%, by weight. Generally, clays having less than 50% $Al_2O_3$ are mixed with alumina-rich material such as calcined bauxite, calcined or tabular alumina, kyanite, raw or calcined fireclay, and the like. In a typical formulation of these components from about 35 to about 50%, by weight, based on their combined weight will be −6 +28 mesh, from about 5 to about 30% is −28 +150 and the balance is −150 mesh. In accordance with the present invention, no carbonaceous material, like graphite and milled pitch, is included. However, and in accordance with the present invention, there is included in the mix a metallic carbide having a critically selected particle size distribution. In the products of the present invention, therefore, substantially the only carbon-containing material is the metallic carbide.

Referring specifically to the metallic carbide, preferred carbides are silicon carbide, SiC, and boron carbide, $B_4C$, especially SiC. The metallic carbide will be present in the mix in an amount between about 3 and about 25%, by weight, based on the combined dry weight of total solids in said mix, "total batch weight," preferably between about 5% and about 15%. As stated, the particle size distribution of the metallic carbide has been found to be critical in order to prevent black core. Thus, the metallic carbide will be substantially −3 mesh and +325 mesh with no more than 1.5%, based on total batch weight, being −325 mesh. A preferred screen analysis for the metallic carbide is (ASTM Procedure E11-70):

|  |  |  |
|---|---|---|
|  | +35 mesh | trace |
| −35 | +48 mesh | about 6% |
| −48 | +100 mesh | about 30% |
| −100 | +200 mesh | about 32% |
| −200 | +325 mesh | about 27% |

The mesh sizes used refer to Tyler standard screen sizes.

The damp mixture is then pressed into the desired shape, usually in brick form, dried and fired at a temperature no greater than about 2300° F. Firing may take place in an oxidizing or reducing atmosphere.

The resulting ceramically bonded body is not impregnated with a carbonaceous material, like molten tar or pitch, the carbon in the body being substantially entirely provided by the metallic carbide.

As mentioned previously, the particle size distribution of the metallic carbide is critical to provide a product free of black core. Thus, amounts of −325 mesh metallic carbide above 1.5% result in black core with attendant reduction in desirable properties, notably reduction in thermal shock and spalling resistance. The product possesses improved resistance to molten slags and metals, exhibiting non-wetting properties and improved abrasion resistance for metal contact operations. Moreover, the present invention allows a carbon source to be introduced to a high alumina refractory composition before firing thus reducing the handling and time required to obtain a finished product. New linings will not generate the smoke associated with tar-or pitch-impregnated brick.

The product of the present invention finds use in hot metal cars, torpedo car linings, linings for molten iron handling vessels including ladles, and as refractory brick resistant to erosion by molten iron or slags, especially moderate to high silica slags as encountered in blast furnaces.

The invention will be better understood from a consideration of the following specific examples which are given for the purpose of illustration only and are not intended to limit the scope of the invention in any way.

EXAMPLES

In these examples, the standard power press method of making refractory brick is employed to form the samples. High alumina mixtures consisting of 85% calcined bauxite and 15% ball clay as binder are prepared by crushing and blending. Silicon carbide is added in an amount of 15%, by weight, based on the dry batch weight. This provides a typical brick making grind wherein from 30 to 50% is −6 +28 mesh, 5 to 30% is −28 +150 mesh and the balance is −150 mesh. About 1-6, by weight, of water and 0.5-2%, by weight, of sulfonated lignin are added. After batch mixing, the material is pressed into bricks, 9×4½×2½ inches at 10,000 psi The shapes are removed from the press and fired to cone 11 (Standard Pyrometric Cone) in an oxidizing or reducing atmosphere.

Two different bonding clays are used:

|  | High Purity | Low Purity |
|---|---|---|
| $Al_2O_3$ (%) | 32.7 | 30 |
| $Fe_2O_3$ (%) | 0.8 | 1.7 |
| Alkalies (%) | 0.5 | 2.3 |

Four different silicon carbides are used:

|  | 400 Grit | 200/F | 36 Grit | 50/F |
|---|---|---|---|---|
| SiC (%) | 98 | 97.6 | 98.6 | 97.1 |
| Free C (%) | 0.7 | 0.5 | 0.2 | 0.7 |
| −325 mesh (%) | 100 | 60 | 3 | 10 |
| Cost ($/lb) | 1.58 | 0.51 | 0.85 | 0.41 |

TABLE I

SiC and clay combinations and results:

| SiC | Clay Purity | Black Core |
|---|---|---|
| 400 Grit | Low | Yes |
| 400 Grit | High | Yes |
| 200/F | Low | Yes |
| 200/F | High | Yes |
| 36 Grit | Low | No |
| 36 Grit | High | No |

TABLE I-continued

| SiC and clay combinations and results: | | |
|---|---|---|
| SiC | Clay Purity | Black Core |
| 50/F | Low | No |
| 50/F | High | No |

TABLE II

| Selected properties of black core and core-free brick: | | | |
|---|---|---|---|
| | Black Core | Core Free | Standard B* | Standard B** |
| Bulk Density (lb/ft³) | 167 | 168 | 163 | 163 |
| Modulus of Rupture (psi) | 3790 | 1600 | 1700 | 3040 |
| Open Porosity (%) | 14.7 | 18.8 | 19.3 | 2.2 |
| Improved Erosion Resistance as compared to Standard (%) | 30 | 51 | 0 | 0 |

*70% alumina burned brick prepared as above but without SiC
**70% alumina, tar-impregnated brick Cost/benefit analyses show that about 15%, by weight, of 50/F SiC provides the maximum corrosion resistance at the lowest cost while still providing core free brick.

Modification is possible in the selection of materials and amounts thereof as well as in procedural techniques used without departing from the scope of the present invention.

We claim:

1. In a high alumina brick-shaped refractory body adapted to be fired to provide a fired fireclay-bonded high alumina refractory brick and containing an intimate mixture of particulate alumina materials to provide an alumina content of at least 50 percent, by weight, based on the dry weight of said mixture, the improvement wherein: (1) there is also included in the mixture metallic carbide particles in an amount between about 3 and about 25 percent, by weight, based on the total dry weight of the mixture, said particles having a particle size of from −3 mesh to +325 with no more than 1.5 percent, by weight, of metallic carbide particles in the mixture being −325 mesh, and (2) carbonaceous material other than the carbide is substantially excluded from the mixture.

2. The refractory body of claim 1 wherein the metallic carbide is silicon carbide or boron carbide.

3. The refractory body of claim 2 wherein the metallic carbide is silicon carbide.

4. The refractory body of claim 1, 2 or 3 wherein the metallic carbide is in an amount from about 5 to about 15%.

5. In a fired fireclay-bonded high alumina refractory brick containing a ceramic-bonded intimate mixture of particulate alumina materials to provide an alumina content of at least 50 percent, by weight, based on the dry weight of said mixture, the improvement wherein: (1) there is also included in the mixture metallic carbide particles in an amount between about 3 and about 25 percent, by weight, based on the total dry weight of the mixture, said particles having a particle size of from −3 mesh to +325 with no more than 1.5 percent, by weight, of metallic carbide particles in the mixture being −325 mesh, and (2) carbonaceous material other than the carbide is substantially excluded from the mixture.

6. The refractory brick of claim 5 wherein the metallic carbide is silicon carbide or boron carbide.

7. The refractory brick of claim 5 wherein the metallic carbide is silicon carbide.

8. The refractory brick of claim 5, 6 or 7 wherein the metallic carbide is present in an amount of from about 5% to about 15%.

9. In a process of preparing a fired, fireclay-bonded high alumina refractory brick involving mixing particulate alumina materials, to provide an alumina content of at least 50%, by weight, based on the dry weight of said mixture, and water to provide a moldable mix, shaping the resulting mixture into brick and firing the resulting brick-shaped body, the improvement wherein: (1) there is included in the mixture metallic carbide particles in an amount between about 3 and about 25 percent, by weight, based on the total dry weight of the mixture, said particles having a particle size of from −3 mesh to +325 mesh with no more than 1.5 percent, by weight of metallic carbide particles in the mixture being −325 mesh, and (2) carbonaceous material other than the carbide is substantially excluded from the mixture.

10. The process called for in claim 9 wherein the metallic carbide is silicon carbide or boron carbide.

11. The process called for in claim 9 wherein the metallic carbide is silicon carbide.

12. The process called for in claims 9, 10 or 11 wherein the metallic carbide is present in an amount from about 5% to about. 15%.

* * * * *